United States Patent
Mittler et al.

(10) Patent No.: US 10,436,323 B2
(45) Date of Patent: Oct. 8, 2019

(54) PISTON RING HAVING A GROOVE SEAL

(71) Applicant: FEDERAL-MOGUL BURSCHEID GMBH, Burscheid (DE)

(72) Inventors: Richard Mittler, Burscheid (DE); Frank Nathem, Mering (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 6 days.

(21) Appl. No.: 15/737,867

(22) PCT Filed: Apr. 19, 2016

(86) PCT No.: PCT/EP2016/058641
§ 371 (c)(1),
(2) Date: Dec. 19, 2017

(87) PCT Pub. No.: WO2016/202485
PCT Pub. Date: Dec. 22, 2016

(65) Prior Publication Data
US 2019/0011047 A1    Jan. 10, 2019

(30) Foreign Application Priority Data
Jun. 19, 2015   (DE) .................. 10 2015 109 826

(51) Int. Cl.
*F16J 9/28*    (2006.01)
*F16J 9/20*    (2006.01)
*F16J 9/26*    (2006.01)

(52) U.S. Cl.
CPC ............... *F16J 9/203* (2013.01); *F16J 9/26* (2013.01)

(58) Field of Classification Search
CPC . F16J 9/00; F16J 9/10; F16J 9/12; F16J 9/14; F16J 9/20; F16J 9/203; F16J 9/206
See application file for complete search history.

(56) References Cited

U.S. PATENT DOCUMENTS

| | | | |
|---|---|---|---|
| 1,519,697 A | 12/1924 | North | |
| 1,548,948 A * | 8/1925 | Hirshfield | F16J 9/28 277/441 |
| 2,034,555 A | 3/1936 | Berstler | |
| 2,085,362 A | 6/1937 | Herbst | |
| 2,387,855 A * | 10/1945 | Phillips | F16J 9/20 277/460 |
| 5,253,877 A * | 10/1993 | DeBiasse | F16J 9/06 277/437 |
| 6,129,358 A * | 10/2000 | Kiesel | F16J 15/164 277/436 |

FOREIGN PATENT DOCUMENTS

| | | |
|---|---|---|
| DE | 35 38 978 C1 | 4/1987 |
| DE | 19942241 A1 | 3/2001 |
| DE | 696 19 862 T2 | 9/2002 |
| DE | 102010034870 A1 | 2/2012 |

* cited by examiner

*Primary Examiner* — Gilbert Y Lee
(74) *Attorney, Agent, or Firm* — Robert L. Stearns; Dickinson Wright, PLLC

(57) ABSTRACT

A piston ring (2) has at least one ring flank seal (14) arranged on a lower ring flank (8) of the piston ring.

14 Claims, 3 Drawing Sheets

PISTON RING HAVING A GROOVE SEAL

BACKGROUND

1. Technical Field

Figure 1:
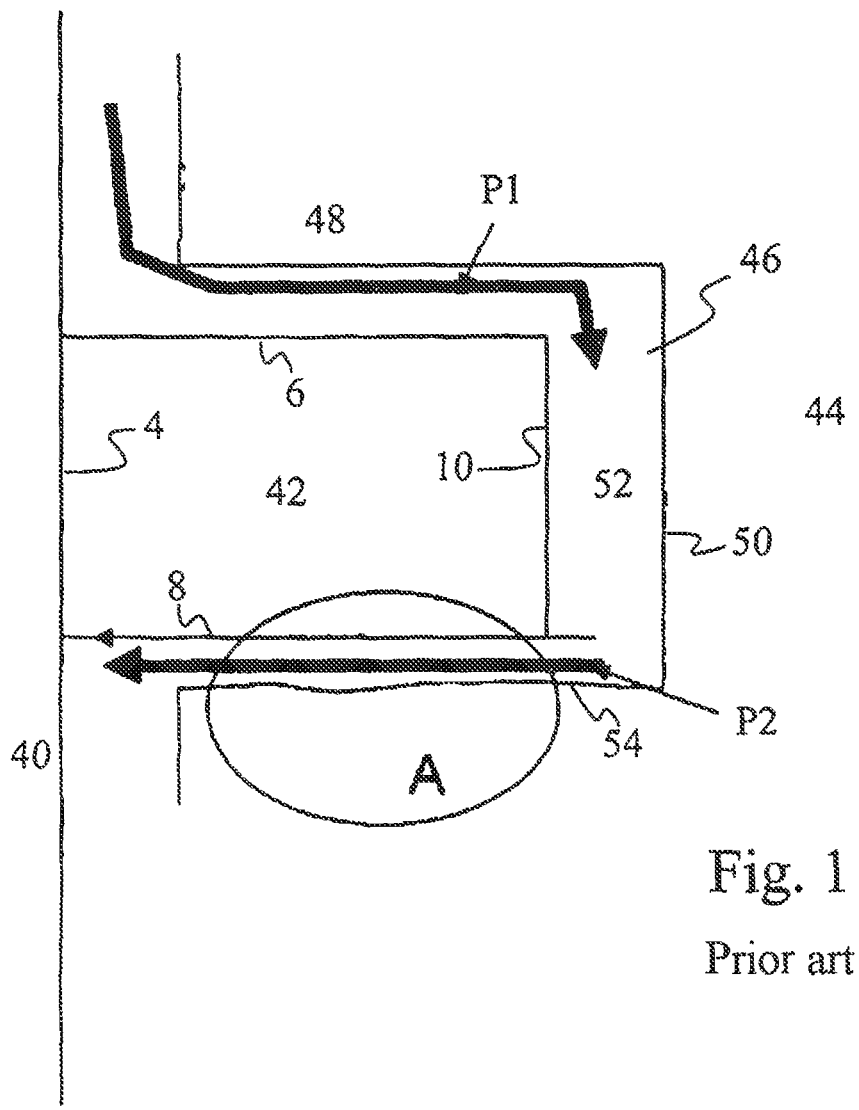

The present invention pertains to a piston ring with a groove seal on a ring flank of the piston ring. The present invention more specifically pertains to a piston ring with a flexible material that is recessed in a groove, wherein the material seals the lower flank of the piston ring, i.e. the far flank referred to the combustion chamber or the piston head.

2. Related Art

Piston rings and, in particular, compression rings are typically used in the first (top) and in the second (central) piston ring groove of internal combustion engines. The function of the compression ring is characterized by the following properties:

1. Sealing the crankcase against the combustion gases.
2. Stripping off excess lubricating oil such that as little lubricating oil as possible remains on the inner cylinder wall and can be combusted.

Rings with a crowned design of the contact surface are used for this purpose. In a compression ring, the majority of the gas not only flows in the direction of the crankcase via the joint, but depending on wall thickness and diameter also via the lower ring flank. This gas flow is nowadays primarily caused by the surface roughness and waviness of the piston ring flank and the piston ring groove flank in the contact regions. Depending on the temperature influence, a deformation of the piston groove can also occur and negatively affect the seal.

It is known to design compression rings in a symmetric or symmetrically crowned fashion with a respective maximum contact point on the contact surface. In this case, the piston ring groove flanks and the piston ring flanks are manufactured with a defined surface roughness in order to give the piston rings a defined mobility in the circumferential direction. Neither the waviness of the piston ring groove nor the waviness of the piston ring itself is usually taken into consideration.

Known piston rings are disclosed, for example, in patent applications DE102010034870 A1 and DE19942241 A1. DE102010034870 A1 discloses piston rings with through-holes in the axial direction such that the wall thickness of the piston ring is purposefully weakened, wherein this purposeful weakening of the wall thickness is most effective, in particular, if the bores are produced in the vicinity of the extreme fiber, in this case near the inside diameter of the piston ring. DE19942241 A1 discloses a piston ring groove with a chrome coating on a piston ring groove flank. DE19942241 A1

SUMMARY

The invention is based on the objective of reducing the "blowby" through the gap between the lower ring flank and the lower piston ring groove flank.

According to an embodiment of the present invention, a piston ring for at least one ring flank seal is proposed, wherein at least one ring flank seal groove is arranged on a lower ring flank. In this context, the lower ring flank is considered to be the far flank referred to the combustion chamber or the piston head. The inventive piston ring furthermore comprises openings that extend from an upper ring flank and/or from an inner surface of the ring to the ring flank seal groove or the bottom of the ring flank seal groove, respectively. In this way, combustion gases can enter the ring flank seal groove through the openings and press a ring flank seal arranged therein downward against the lower piston ring groove flank in order to thereby improve the sealing effect at this location.

In this case, a sealing effect is usually realized by means of a thin gap between friction partners with a defined surface roughness, which in comparison with the blowby at the piston ring gap or the throttle window is almost negligible. Until now, seals were not used for this purpose due to the high thermal and mechanical stresses, as well as the necessary thermal dissipation from the piston into the inner cylinder wall via the piston ring and the requirement that the piston ring should be freely rotatable in the circumferential direction. In this context, the invention aims to realize the sealing effect with one or more sealing elements that are arranged on a lower ring flank. These sealing elements should not completely close the overall gap between the piston ring and the piston ring groove, but rather merely seal the gap between the lower ring flank and the lower piston ring groove flank in an enhanced fashion.

In an exemplary embodiment of the inventive piston ring, at least one ring flank seal is arranged in the at least one ring flank seal groove and at least partially recessed therein. This makes it possible to use a larger and, in particular, thicker piston ring seal such that a prolonged service life or action time can be achieved. It is preferred to respectively arrange the at least one ring flank seal in the at least one ring flank seal groove such that it is movable in the axial direction in order to enable the combustion gases to flow into the space between the ring flank seal and the bottom of the ring flank seal groove through the openings and to thereby press the ring flank seal against the lower piston ring groove flank of the piston. In this case, the lower ring flank is provided with at least one ring flank seal groove. However, it is also possible to arrange two, three or more ring flank seal grooves on the lower ring flank in order to accommodate one or more ring flank seals.

In another exemplary embodiment of the present invention, the at least one ring flank seal groove is realized in the form of a trapezoidal groove or a rectangular groove.

In another exemplary embodiment of the piston ring, the at least one ring flank seal groove is realized in the form of a dovetail groove. The main advantage of this groove shape can be seen in that the seal cannot easily pop out of the ring flank seal groove during the installation of the piston ring into the piston ring groove.

In another exemplary embodiment of the piston ring, the at least one ring flank seal groove respectively ends in front of the piston ring joint. This embodiment makes it possible to prevent the ring flank seal in the ring flank seal groove from laterally moving out of the ring flank seal groove in the direction of the ring gap such that prolonged service lives can be achieved.

In another exemplary embodiment of the piston ring, the ring flank seal groove extends up to the piston ring joint. This makes it possible to insert a closed sealing ring, which likewise extends over the piston ring joint, into the ring flank seal groove. In this case, the ring flank seal groove may be widened toward the joint such that the ring flank seal can be moved in the ring flank seal groove. However, the ring flank seal groove or the ring flank seal may also be provided with elements that prevent a circumferential motion of the ring flank seal in the ring flank seal groove.

In another exemplary embodiment of the piston ring, the ring flank seal is realized in the form of an O-ring.

In an exemplary embodiment of the piston ring, the piston ring comprises openings that extend from an upper ring flank to the ring flank seal groove. In this case, the openings serve for pressing a ring flank seal against the ring flank seal groove flank in that combustion gases flow from the combustion chamber behind the ring flank seal through the openings and thereby press the ring flank seal against the lower ring flank seal groove flank. This is preferably realized with a dovetail-shaped ring flank seal groove, in which an area can exert greater pressure and therefore a greater force upon the ring flank seal.

In another embodiment of the piston ring, the piston ring comprises openings that extend from an inner side of the piston ring to the ring flank seal groove. The combustion gases are located in the gap between the upper ring flank and the upper piston ring groove flank, as well as between the inner side or inner surface of the piston ring and the bottom of the piston ring groove. A channel, which radially extends from the inner surface to the ring flank seal groove above the ring flank seal, can therefore also be machined into the piston ring. In these embodiments, combustion gases can flow behind the ring flank seal and thereby press the ring flank seal against the lower piston ring groove flank in order to enhance the sealing effect between the lower ring flank and the lower piston ring groove flank. The ring flank seal may be elastic and not completely fill the ring flank seal groove such that the pressure of the combustion gases can press the ring flank seal against the lower piston ring groove flank and thereby seal the gap between the lower ring flank and the lower piston ring [groove] flank. Since the ring flank seal groove only extends over a fraction of the lower ring flank, the load transfer can take place via the surfaces that do not contain the ring flank seal groove.

In another exemplary embodiment of the piston ring, a material of the at least one ring flank seal is elastic. An elastic ring flank seal material makes it possible to achieve a superior sealing effect due to the fact that it can be deformed under the pressure in a chamber between the bottom of the ring flank seal groove and the ring flank seal.

In another exemplary embodiment of the piston ring, the material of the at least one ring flank seal comprises a metallic material such as copper, bronze and/or aluminum and/or a temperature-resistant plastic such as polytetrafluoroethylene, silicone rubber or a temperature-resistant elastomer. Metallic materials such as copper, bronze and/or aluminum or their respective alloys can be produced and processed in a relatively simple fashion. Metallic materials of the type described above make it possible to precisely adjust the strength and the temperature resistance of the ring flank seal. A metallic material furthermore makes it possible to adjust the hardness of the material in such a way that it can interact with the respective sealing surface and, in particular, the lower flank of the piston ring groove in an aluminum piston in order to achieve a particularly sound sealing effect. Polytetrafluoroethylene is a conventional material that is designed for high thermal and mechanical stresses, wherein the ring flank seal may be entirely or partially made of this material. Silicone seals can in the meantime also be produced with great precision and high temperature stability. Polyparaphenylene may also be used as heavy-duty plastic. The ring flank seal may furthermore be coated in order to take into account the material properties of the respective friction partners, i.e. the aluminum piston and the cast iron or steel piston rings.

In another exemplary embodiment of the piston ring with ring flank seal, the material of the at least one ring flank seal has a significantly higher coefficient of thermal expansion than the material of the piston ring itself. In this way, the seal material can protrude from the ring flank seal groove as the operating temperature increases and thereby enhance the sealing effect at this location. Furthermore, the ring can still carry out a circumferential motion in the piston ring groove, particularly when the cold engine is started.

In another exemplary embodiment of the piston ring with ring flank seal, the at least one ring flank seal is arranged on an inner half of the piston ring. The crowned wear of conventional compression rings suggests that the ring twists during the operation. Since the sealing effect is primarily required during the power stroke, the seal should also be arranged at the location, at which the highest surface pressure between the piston ring flank and the piston ring groove flank occurs. This design furthermore makes it possible to minimally affect the heat transfer from the piston into the cooled inner cylinder wall via the piston ring.

In a preferred exemplary embodiment, the piston ring is a compression ring. Compression rings are most suitable for the present invention because they are subjected to the greatest pressure differential. Oil control rings are already sealed relatively well by the oil film.

THE DRAWINGS

Figure 2:
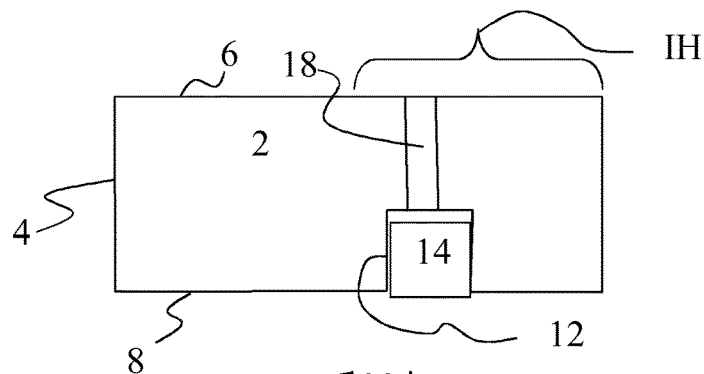
Figure 3A:
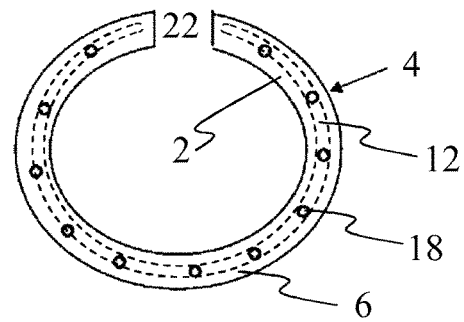
Figure 3B:
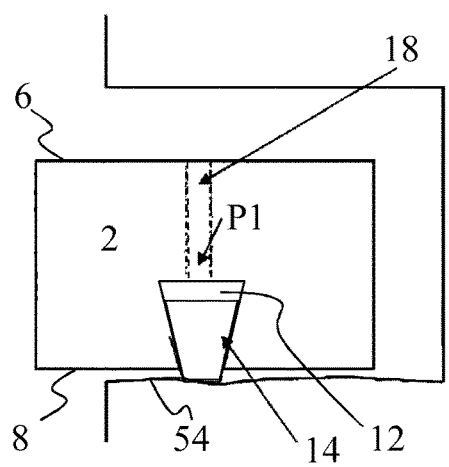
Figure 3C:
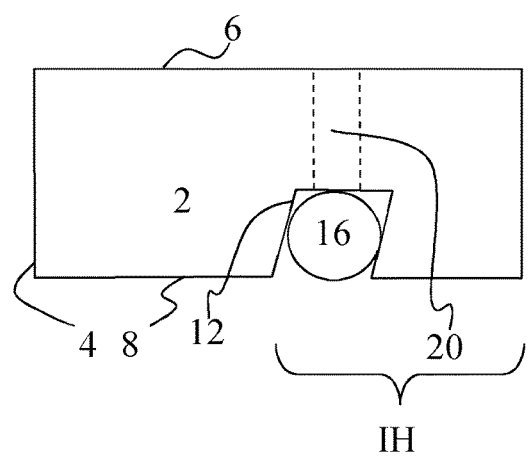
Figure 4A:
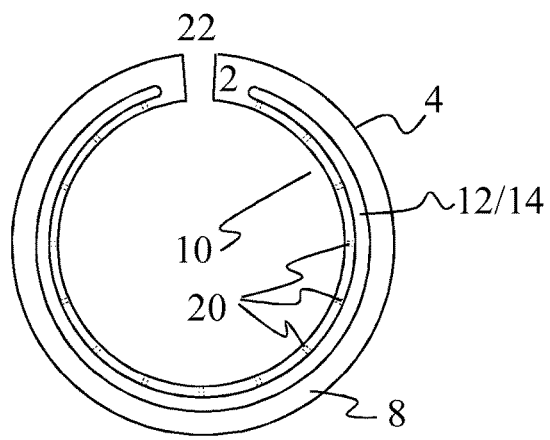
Figure 4B:
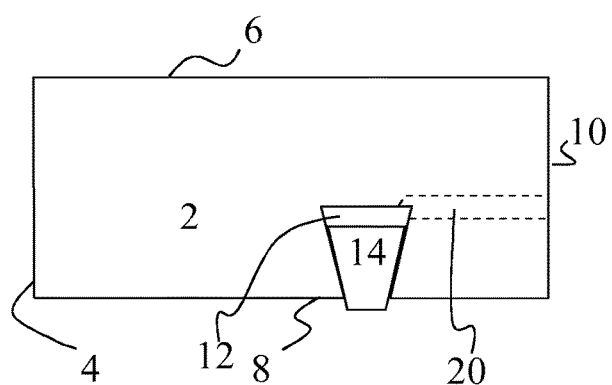
Figure 4C:
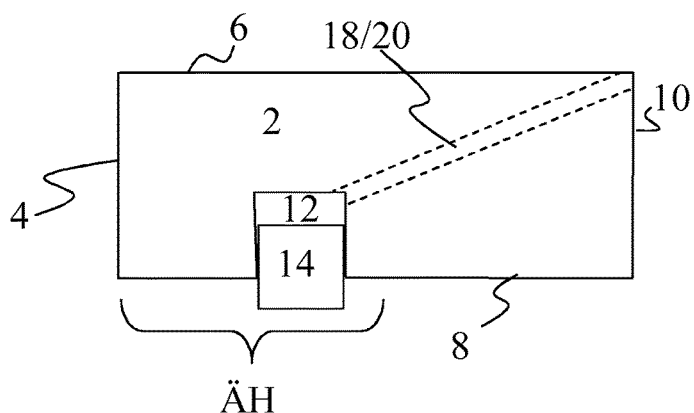

The present invention is described in greater detail below with reference to schematic drawings of individual exemplary embodiments, in which FIG. 1 shows a section through a conventional piston ring in the installed state, FIG. 2 shows a section through an embodiment of an inventive piston ring, FIG. 3A shows a horizontal projection of an embodiment of an inventive piston ring, FIG. 3B shows a section through an inventive piston ring in the installed state, FIG. 3C shows another section through an inventive piston ring, FIG. 4A shows a horizontal projection of another embodiment of an inventive piston ring, FIG. 4B shows a section through another inventive piston ring in the installed state, and FIG. 4C shows another section through another inventive piston ring.

DETAILED DESCRIPTION

In the drawings, as well as in the following description, identical or similar elements and components are identified by the same reference symbols.

FIG. 1 shows a section through a conventional piston ring 42 that is inserted or placed into a piston ring groove 46 of a piston 44. The conventional piston ring 42 respectively rests against a liner or a cylinder 40 with a contact surface 4. The conventional piston ring 42 rests on the lower piston ring groove flank 54 with a far flank referred to the combustion chamber, which is located on top in the figure, or the lower ring flank 8, respectively. The surface roughness of the lower piston ring groove flank 54 is highly exaggerated in this figure. The upper ring flank 6 is spaced apart from the upper piston ring groove flank 48 as expected during a power stroke of the engine when the combustion gases press the piston ring 42 downward in the piston ring groove. The volume 52 behind the ring extends between the inner surface 10 of the piston ring and the bottom 52 of the piston ring groove. During a power stroke, the pressure P1 in the gap between the upper ring flank 6 and the upper piston ring groove flank 48 is higher than the pressure P2 in the volume 52 behind the ring during a power stroke. Due to the surface roughness of the lower ring flank 8 and the lower piston ring groove flank 54, a portion of the combustion gases with the pressure P2 can escape through the sealing gap A formed at this location. The present invention is based on the objective of enhancing the sealing effect of the sealing gap A. Traditionally, it would be attempted to achieve this by reducing the surface roughness of the lower ring flank 8 and the lower piston ring groove flank 54.

FIG. 2 shows a section through an embodiment of an inventive piston ring. The piston ring is provided with a ring flank seal groove 12, in which a ring flank seal 14 is arranged. The ring flank seal groove 12 and the ring flank seal 14 only cover a portion of the lower ring flank such that the majority of the lower ring flank 8 can contact a not-shown lower piston ring groove flank and the heat transfer from the piston into the inner cylinder wall via the ring 2 therefore remains largely unaffected. The material of the ring flank seal 14 may have a higher coefficient of thermal expansion in order to the seal the gap in an enhanced fashion, particularly in a motor that has reached its operating temperature. Openings 18 extend upward from the bottom of the ring flank seal groove 12 and enable combustion gases to press the ring flank seal 14 in the ring flank seal groove 12 downward against a lower piston ring groove flank of a piston, into which the inventive piston ring was inserted.

Trapezoidal grooves or u-shaped grooves may also be used instead of a rectangular groove. In FIG. 2, the ring flank seal 14 is radially arranged in an inner half (IH) of the piston ring 2.

FIG. 3A shows a horizontal projection of an embodiment of an inventive piston ring 2. The upper ring flank 6 is visible in this horizontal projection, wherein the outer edge is formed by the contact surface 4 and the piston ring joint is identified by the reference symbol 22. The ring flank seal groove 12 is merely indicated with broken lines because it is located on the far side of the piston ring 2. The ring flank seal groove 12 ends in front of the piston ring joint 22 in this case. However, the ring flank seal groove 12 may also extend up to the piston ring joint 22 and the ring flank seal 14 may be prevented from creeping out of the ring flank seal groove 12 in the circumferential direction with mechanical means.

FIG. 3B shows a section through an inventive piston ring 2 in the installed state. A horizontal projection of this piston ring 2 corresponds to the horizontal projection in FIG. 3A. The piston ring is inserted into the piston ring groove of a piston. The ring flank seal groove 12 is realized trapezoidal in order to retain the ring flank seal 14 in the ring flank seal groove 12. The piston ring 2 is provided with openings 18 that extend from the upper ring flank 6 to the ring flank seal groove 12. Combustion gases with the pressure P1 can spread as far as into the ring flank seal groove 12 through the openings 18 and press the ring flank seal 14 out of the ring flank seal groove 12 and against the lower piston ring groove flank 54. If the ring flank seal 14 is sufficiently elastic, the pressure exerted upon the piston ring groove flank 54 can increase in accordance with the taper ratio of the ring flank seal groove 12. In FIG. 3B, the ring flank seal 14 is radially arranged in the center of the piston ring 2.

FIG. 3C shows another section through another example of an inventive piston ring. A horizontal projection of this piston ring 2 likewise corresponds to the horizontal projection in FIG. 3A. The ring flank seal groove 12 has the shape of a parallelogram in order to provide an enhanced sealing geometry for the ring flank seal 14, which is realized in the form of an O-ring 16 or open O-ring 16, respectively. However, the O-ring 16 could also be closed if the material is sufficiently strong for being exposed to the combustion chamber gases in the joint region and if the ends of the ring flank seal groove 12 are at the joint tapered off sufficiently smooth for preventing the O-ring 16 from being abraded.

FIG. 4A shows a horizontal projection of another embodiment of an inventive piston ring 2. The lower ring flank 6, as well as the ring flank seal groove 12 or the ring flank seal 14, is visible in this horizontal projection from below. The outer edge is formed by the contact surface 4 and the piston ring joint is identified by the reference symbol 22. Openings 20 extend from the inner side or inner surface 10 of the piston ring 2 to the ring flank seal groove 12. The openings are merely indicated with broken lines because they radially extend through the piston ring. The ring flank seal groove 12 also ends in front of the piston ring joint 22 in this embodiment. In this case, the pressure exerted upon the seal 14 is lower than in the embodiment according to FIGS. 3A to 3C such that the ring flank seal 14 can be prevented from being pressed out of the ring flank seal groove 12 with excessive force.

FIG. 4B shows a section through an inventive piston ring 2 in the installed state. A horizontal projection of this piston ring 2 corresponds to the horizontal projection in FIG. 4A, The ring flank seal groove 12 is realized trapezoidal in order to retain the ring flank seal 14 in the ring flank seal groove 12, The piston ring 2 is provided with openings 20 that extend from the inner surface 10 of the piston ring to the ring flank seal groove 12, Combustion gases with the pressure P2 can spread as far as into the ring flank seal groove 12 through the openings 18 and press the ring flank seal 14 out of the ring flank seal groove 12 and against the not-shown lower piston ring groove flank 54.

FIG. 4C shows another section through another example of an inventive piston ring 2. A horizontal projection of this piston ring 2 likewise corresponds to the horizontal projection in FIG. 4A. The ring flank seal groove 12 is realized rectangular in order to generate the least resistance possible to a displacement in the direction of the not-shown lower piston ring groove flank 54. Due to the geometry of the ring flank seal groove 12, the lower pressure P2 also suffices for achieving an adequate sealing effect of the sealing gap. In FIG. 4C, the ring flank seal 14 is radially arranged in an outer half (ÄH) of the piston ring 2.

Not all combinations of ring flank seal grooves 12, ring flank seals 14, openings 18 and 20 and radial positions of the ring flank seal grooves were discussed individually in order to avoid unnecessary repetitions. However, these combinations, which arise from the described embodiments, should likewise be considered as being disclosed.

The invention claimed is:

1. A piston ring for at least one ring flank seal, wherein at least one ring flank seal groove is arranged on a lower ring flank of the piston ring, comprising openings that extend from an upper ring flank and/or from an inner surface of the ring to the ring flank seal groove, wherein a ring flank seal is provided that is at least partially accommodated in the at least one ring flank seal groove.

2. The piston ring with ring flank seal according to claim 1, wherein the at least one ring flank seal groove comprises a trapezoidal groove.

3. The piston ring with ring flank seal according to claim 1, wherein the at least one ring flank seal groove comprises a dovetail groove.

4. The piston ring with ring flank seal according to claim 1, wherein the at least one ring flank seal groove terminates in a circumferential direction before a ring gap of the piston ring.

5. The piston ring with ring flank seal according to claim 1, wherein the ring flank seal groove extends up to a joint of the piston ring.

6. The piston ring with ring flank seal according to claim 1, wherein the at least one ring flank seal comprises an O-ring.

7. The piston ring with ring flank seal according to claim 1, wherein the openings extend from the upper ring flank to the ring flank seal groove.

8. The piston ring with ring flank seal according to claim 1, wherein the openings extend from the inner surface of the ring to the ring flank seal groove.

9. The piston ring with ring flank seal according to claim 1, wherein the at last one ring flank seal is fabricated of elastic material.

10. The piston ring with ring flank seal according to claim 1, wherein the material of the at least one ring flank seal comprises a metallic material selected from the group consisting of copper, bronze and/or aluminium and/or a temperature-resistant plastic such as polytetrafluoroethylene, silicone rubber and/or a temperature-resistant elastomer.

11. The piston ring with ring flank seal according to claim 1, wherein the material of the at least one ring flank seal has a significantly higher coefficient of thermal expansion than the piston ring.

12. The piston ring with ring flank seal according to claim 1, wherein the at least one ring flank seal is arranged on an inner half of the radial thickness of the piston ring.

13. The piston ring with ring flank seal according to claim 1, wherein the piston ring is a compression ring.

14. A piston ring for at least one ring flank seal, said piston ring comprising:

an upper ring flank, a lower ring flank, and an inner surface;

said piston ring being configured such that when installed in an piston ring groove of a piston, said lower ring flank is arranged on an opposite side of said upper ring flank from a piston head of the piston;

at least one ring flank seal groove arranged on said lower ring flank;

a plurality of openings extending from at least one of said upper ring flank and said inner surface to said at least one ring flank seal groove; and a ring flank seal at least partially disposed in said at least one ring flank seal groove.

* * * * *